(12) United States Patent
Campbell et al.

(10) Patent No.: US 7,415,777 B2
(45) Date of Patent: Aug. 26, 2008

(54) SIMPLE CONTROLLER FOR A POWER OPERATED TAPE MEASURE

(75) Inventors: David C. Campbell, Bel Air, MD (US); Louis August Gibbons, Stevensville, MD (US); Gavin K F Ng, Sha Tin (HK)

(73) Assignee: Black & Decker Inc., Towson, MD (US)

( * ) Notice: Subject to any disclaimer, the term of this patent is extended or adjusted under 35 U.S.C. 154(b) by 0 days.

(21) Appl. No.: 11/873,155

(22) Filed: Oct. 16, 2007

(65) Prior Publication Data

US 2008/0028628 A1   Feb. 7, 2008

Related U.S. Application Data

(63) Continuation of application No. 11/277,684, filed on Mar. 28, 2006, now Pat. No. 7,284,339.

(51) Int. Cl.
*G01B 3/10* (2006.01)
(52) U.S. Cl. .................. 33/755; 242/393; 242/390.8
(58) Field of Classification Search ............ 33/755, 33/759, 760, 761, 762, 763, 767; 242/390.8, 242/390.9, 393, 394, 394.1
See application file for complete search history.

(56) References Cited

U.S. PATENT DOCUMENTS

| | | | | |
|---|---|---|---|---|
| 4,649,649 A | * | 3/1987 | Fain ............................ | 242/393 |
| 5,875,987 A | * | 3/1999 | Pullen ......................... | 33/755 |
| 6,295,740 B1 | * | 10/2001 | Mitchell ....................... | 33/761 |
| 6,453,575 B1 | * | 9/2002 | Hsieh ........................... | 33/761 |
| 6,477,785 B1 | * | 11/2002 | Hsu ............................ | 33/761 |
| 6,789,329 B1 | * | 9/2004 | Hester ......................... | 33/760 |
| 7,284,339 B1 | * | 10/2007 | Campbell et al. ............. | 33/755 |
| 7,293,367 B1 | * | 11/2007 | Zhu et al. .................... | 33/755 |
| 2002/0129510 A1 | * | 9/2002 | Hsieh ........................... | 33/761 |
| 2006/0096113 A1 | * | 5/2006 | Kang et al. ................... | 33/761 |
| 2008/0034604 A1 | * | 2/2008 | Critelli et al. ................. | 33/767 |

\* cited by examiner

*Primary Examiner*—G. Bradley Bennett
(74) *Attorney, Agent, or Firm*—Shook, Hardy & Bacon L.L.P.

(57) ABSTRACT

A power operated tape measure enables measuring tape extension through a drive mechanism, as well as measuring tape retraction. A tape cartridge assembly including an annular reel, a measuring tape wound onto the reel, as well as a spring coupled with the reel, and is positioned within a housing shell of the tape measure. A drive mechanism accomplishes tape extension out of the housing shell, and optionally, tape retraction into the housing shell by engaging with a surface of the measuring tape. A primary actuator initiates input on one or more switches that selectively control operation of the drive mechanism, and includes a lever arm for a user to make selections regarding tape extension and retraction. A retraction actuator is moveable by a user to cause the drive mechanism to become disengaged from the surface of the tape, whereby spring powered retraction of the tape is permitted.

8 Claims, 8 Drawing Sheets

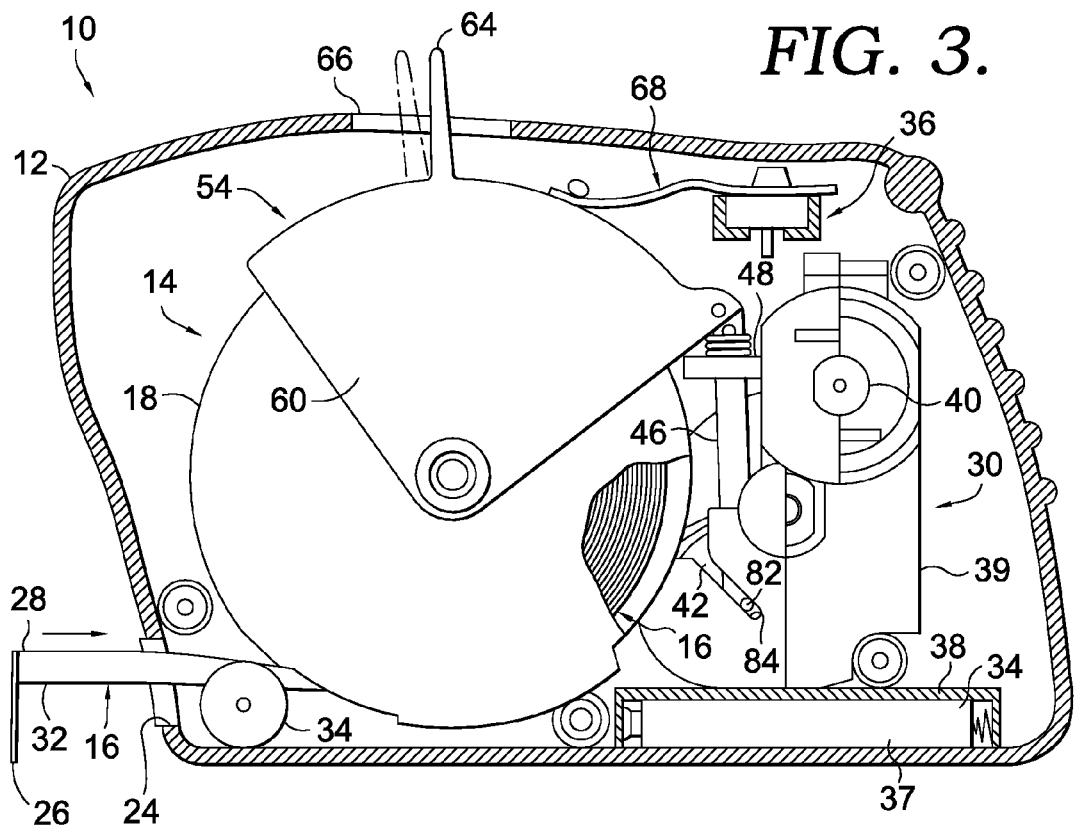
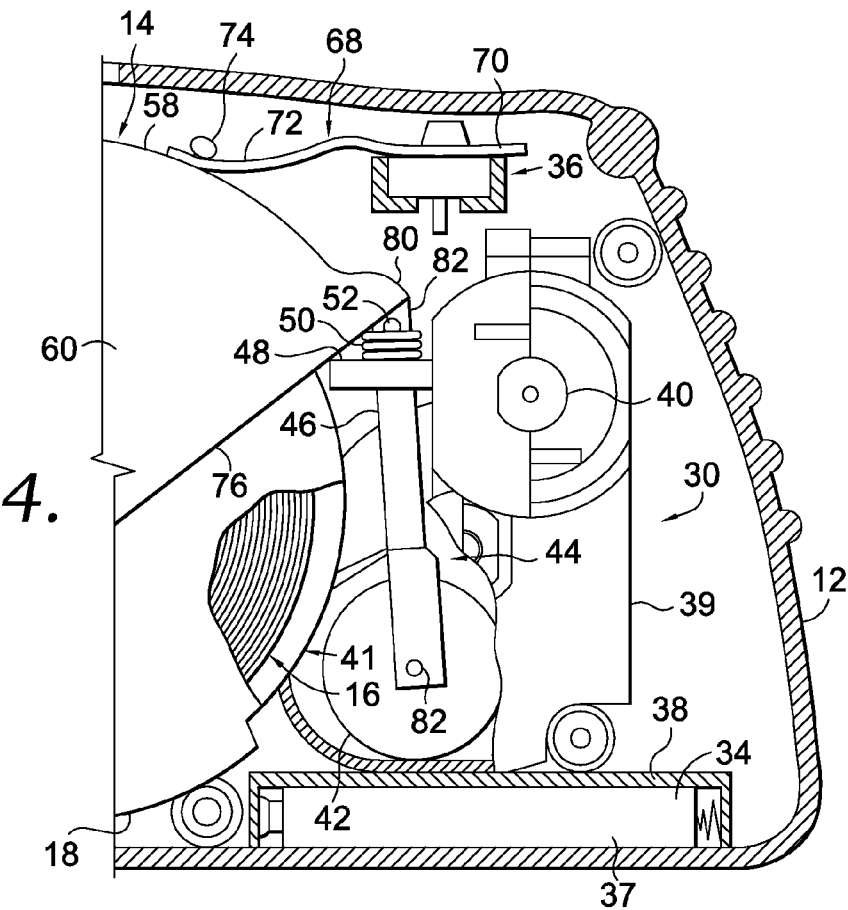

SIMPLE CONTROLLER FOR A POWER OPERATED TAPE MEASURE

CROSS-REFERENCE TO RELATED APPLICATIONS

This application is a continuation of U.S. application Ser. No. 11/277,684, filed Mar. 28, 2006, and entitled "SIMPLE CONTROLLER FOR A POWER OPERATED TAPE MEASURE".

STATEMENT REGARDING FEDERALLY SPONSORED RESEARCH OR DEVELOPMENT

Not applicable.

BACKGROUND OF THE INVENTION

This invention relates generally to retractable tape measurement devices. More particularly, the present invention is directed to a tape measure requiring a simple range of user inputs to accomplish tape extension and retraction.

Tape measurement devices of the type employing a tape retraction feature, also referred to as "tape measures", generally have a housing formed by opposed sidewalls and with an aperture to allow an elongated tape or "blade" having measurement indicia to extend out of and retract into the housing as needed. The tape is typically wound on a reel in a coil rolled manner with the reel being rotatably mounted within the housing between the sidewalls. A first end of the tape may be attached to the reel and second free end of the tape typically has a stop or hook to prevent the second end from entering the housing. A retracting means, such as a recoil spring, is coupled with the reel to rotate the reel in a direction to wind the tape onto the reel and retract the tape into the housing. Alternatively, if a stationary reel is used to guide winding of the tape, the retracting means may be directly attached to the tape. A user can pull on the stop against the force of the retracting means to extend the tape out of the housing for making a measurement.

Tape measures with retraction features have evolved to include power operated tape extension as a convenience to users. Some of these power operated tape measures include a drive mechanism for the tape that couples a motor with a gear or roller system that engages a bottom or outwardly exposed surface of the tape while the tape is wound on the reel. The motor may then drive the unwinding of the tape from the reel through the gear/roller system so that the tape extends out of the housing a selected amount. Motorized tape retraction involves driving the tape in the opposite direction from extension to rewind the tape onto the reel. Power operated tape extension is also beneficial when a user does not have two free hands to allow for holding of the tape measure housing in one hand and pulling the tape to a desired length with the other hand.

It would be desirous to improve the ease of operation for users of power operated tape measures, while providing a reliable design. Some prior art powered tape measures employ extension and/or retraction mechanisms that are complex or cumbersome to operate single handedly.

BRIEF SUMMARY OF THE INVENTION

A tape measure of the present invention provides for power operated tape extension, and optionally, power operated tape retraction into a tape measure housing. Beneficially, tape extension and retraction features may be controlled by input on an actuator in simple, opposed motions.

In one aspect, the tape measure has a housing shell within which is positioned a tape cartridge assembly. The tape cartridge assembly includes an annular reel with a tape having a bottom surface wound thereon and being under the influence of a spring for biasing the tape into a wound position on the reel. Extension of the tape out of the housing shell is accomplished by a drive mechanism that engages with the bottom surface of the tape and an associated power source electrically coupled with the drive mechanism. One or more switches control power flow between the power source and the drive mechanism to enable tape extension, and optionally, tape retraction into the housing shell. A primary actuator operably mounted within the housing shell presents a body overlying a portion of the tape cartridge and an arm extending from the periphery of the body through an opening in the housing shell. The arm is moveable in opposed forward and backward directions to cause the actuator to move and selectively initiate input on the one or more switches regulating drive mechanism activity. Movement of the arm to a forward position enables the drive mechanism to cause tape extension. Likewise, movement of the arm to a rearward position allows for tape retraction. Additionally, a retraction actuator is moveable by a user to cause the drive mechanism to become disengaged from the surface of the tape, whereby spring powered retraction of the tape is permitted.

In another aspect, the one or more switches include a first switch interconnected with the actuator body by a resilient member transferring motion of the actuator into movement of the first switch between an activated position, when the actuator arm is in the forward position, and a deactivated position, when the actuator arm is in a middle or rest position between the forward and rearward positions. The drive mechanism also includes a frame for supporting a drive wheel. The frame is pivotably coupled with the housing and is biased in a direction that urges the drive wheel into engagement with the tape bottom surface. In this way, movement of the arm to the rearward position causes a back end of the actuator to apply a force on the frame that overcomes the biasing on the frame and moves the drive wheel out of engagement with the bottom surface of the tape so that a spring load on the reel retracts the tape back into the housing shell.

Both a first switch and a second switch are provided in another aspect of the invention for coupling with the drive mechanism. The tape measure may therefore enable both power operated tape extension and retraction by the first switch activating drive mechanism operation in a forward direction corresponding with the actuator arm being in the forward position and the second switch activating drive mechanism operation in a rearward direction corresponding with the actuator arm being in a first rearward position. The drive mechanism includes a frame, with a drive wheel rotatable mounted thereon that is pivotably mounted within the housing shell and biased in a direction that urges the drive wheel into engagement with the tape bottom surface. Thus, retraction of the tape into the housing under the influence of a spring load on the reel—as opposed to being through power operated tape retraction—may be had through movement of the arm to a second rearward position behind the first rearward position, where a back end of the actuator applies a force on the frame that pivots the frame to move the drive wheel along an arcuate path away from the tape bottom surface.

In yet another aspect of the invention, first and second switches are separated by the actuator. The switches are positioned to enable both power operated tape extension and retraction as the result of contact with the actuator when it is moved to a forward position or a rearward position respectively. A separate mechanical tape retraction actuator is provided opposite the actuator for controlling power operation, such that a portion of the retraction actuator is accessible through an opening in the bottom of the housing to permit retraction of the tape into the housing under the influence of a spring load on the reel. Movement of the retraction actuator in a rearward direction pivots the drive wheel out of abutting contact with the bottom surface of the tape, thereby permitting the recoil spring to act upon the reel and withdraw the tape.

The tape measure may also be provided with a blade wiper mechanism to prevent the accumulation of contaminants on the bottom surface of the tape that may interfere with the ability of the drive mechanism to drive the tape out of or into the housing. Similarly, a guide collar and/or rolling blade support may be provided at the opening in the housing where the tape extends therethrough to support the extension of the tape during use.

BRIEF DESCRIPTION OF THE SEVERAL VIEWS OF THE DRAWING

In the accompanying drawings which form a part of the specification and are to be read in conjunction therewith and in which like reference numerals are used to indicate like elements in the various views:

FIG. 3 is a side elevational view of the tape measure of FIG. 1, with the actuator in a rearward position for activating spring operated tape retraction;

FIG. 4 is an enlarged fragmentary side elevational view of the tape measure of FIG. 3, with various components removed to show the drive mechanism disengaged from the tape;

DETAILED DESCRIPTION OF THE INVENTION

Figure 1:
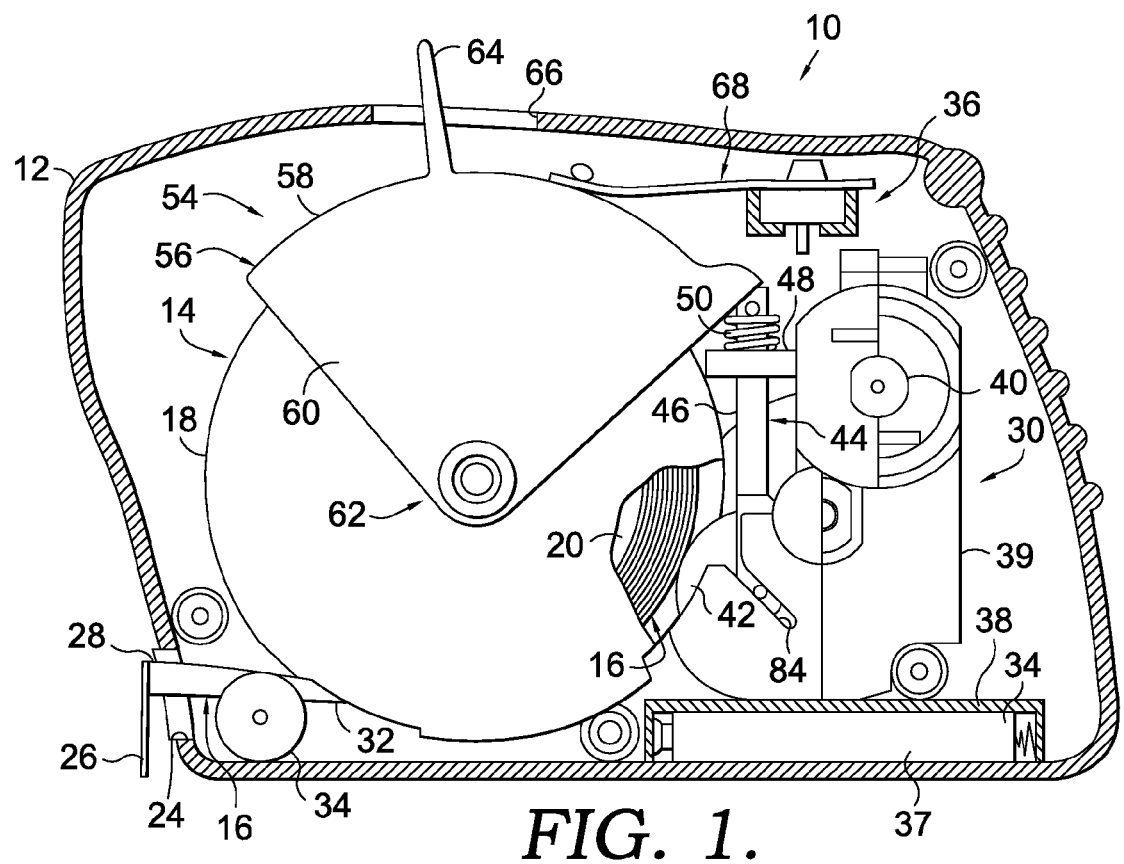
FIG. 1 is a side elevational view of one embodiment of a tape measure of the present invention, partially in section, with the actuator for controlling tape extension and retraction in a rest position.
Figure 9:
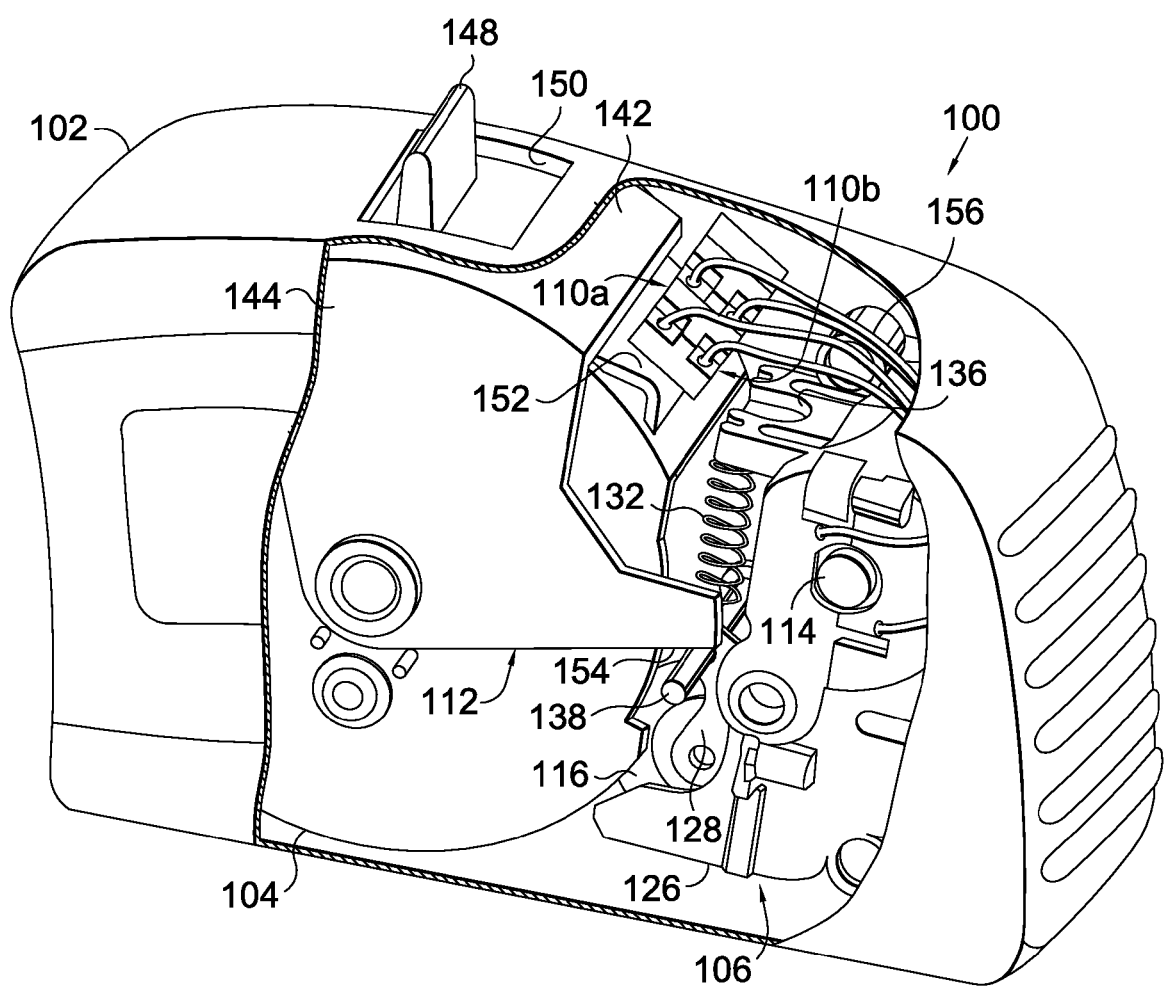
FIG. 9 is a perspective view of the tape measure of FIG. 5 with a portion of the housing removed to show various internal components thereof.

Referring now in more detail to the drawings, and initially to FIG. 1, there is illustrated an embodiment of a tape measure of the present invention designated by the reference numeral 10. The tape measure 10 has a housing shell, or housing, 12 enclosing various components that control operation of the tape measure 10, as will be more fully explained below with reference to FIGS. 2-4. An exemplary shape for the housing 12 is illustrated in FIG. 9, and may be implemented with another tape measure 100 embodiment shown in FIGS. 5-9, as well as with the embodiment of the tape measure 10 shown in FIGS. 1-4.

A tape cartridge assembly 14 is mounted within the housing 12 for storage of elongate tape 16. The assembly 14 includes a cartridge cover 18 that is coupled to the interior of the housing 12 and a reel 20 rotatably mounted with and surrounded by the cartridge cover 18. The cartridge cover 18 may be formed of two halves that mate in clamshell fashion. The elongate tape 16 is attached with the reel 20 on a trailing end of the tape so that it may be wound thereon for storage. Preferably, a biasing means (not shown) of the conventional type, such as a spring, is coupled with the reel 20 to urge rotation of the reel 20 within the cartridge cover 18 in a direction as to wind the tape 16 onto the reel 20 and thereby retract an amount of extended tape back into the housing 12. Measurement indicia are also marked along a top surface 22 of the elongate tape 16 so that an amount of the tape 16 extended out of a lower opening 24 in the housing shell 12 can be used to make a measurement of the length of an object adjacent to the tape 16. A hook or stop 26 extends downwardly from distal end 28 of the elongate tape 16 to prevent retraction of the proximal end 28 into the housing 12. A guide roller 34 may also be positioned within the housing 12 for directing the elongate tape 16 through the lower opening 24 into and out of the housing 12.

Figure 2:
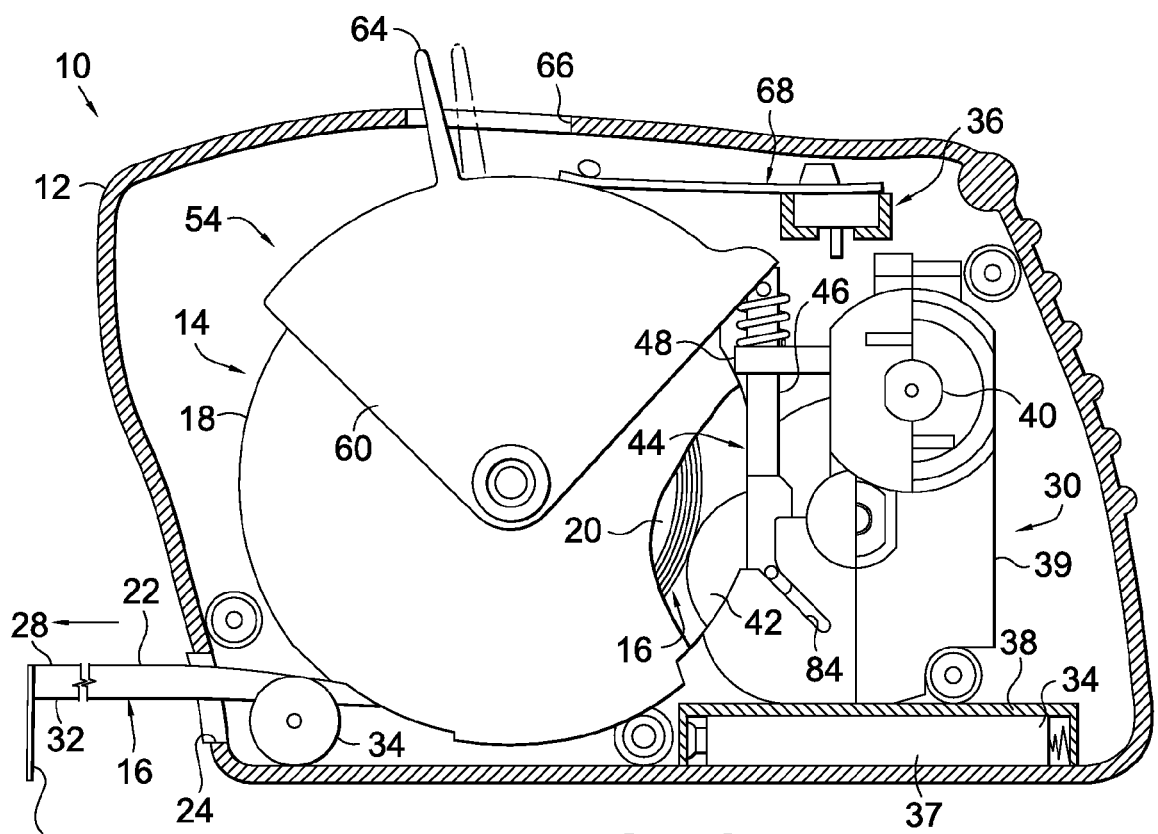
FIG. 2 is a side elevational view of the tape measure of FIG. 1, with the actuator in a forward position for activating powered tape extension.

As seen in a neutral or rest position in FIG. 1, the elongate tape 16 of the tape cartridge assembly 14 moves under the influence of a drive mechanism 30, in addition to the biasing means coupled with the reel 20. The drive mechanism 30 is engagable with a bottom surface 32 of the elongate tape 16 to impart a force thereon sufficient to overcome the biasing on the reel 20 in the opposing direction to rotate the reel 20 and thereby drive the tape 16 in a longitudinal direction out of the housing 12, as depicted in FIG. 2. Conversely, disengaging of the drive mechanism 30 from the tape bottom surface 32 allows the biasing on the reel 20 to retract the amount of the elongate tape 16 extended out of the housing 12 back into the housing, as depicted in FIGS. 3 and 4. The structural components and operational schemes of the drive mechanism 30 will be explained in more detail below.

An electrical circuit is formed through the electrical coupling of the drive mechanism 30 with a power source 34 and an electrical switch 36. The power source 34 may include, for instance, a battery 37 (or batteries) received within a battery chamber 38 positioned within the housing 12. In this embodiment, the electrical switch 36 preferably moves between "on" and "off" positions to regulate the flow of current between the power source 34 and the drive mechanism 30. Thus, movements of the electrical switch 36, through electrical coupling and decoupling of the drive mechanism 30 and the power source 34, selectively control extension of the elongate tape 16 out of the housing 12. As can be observed, electrical wiring forming a circuit between the drive mechanism 30, the power source 34 and the switch 36 has been removed in FIGS. 1-4 to provide an unobstructed view of the various components of the tape measure 10 within the housing 12. However, those of skill in the art will appreciate that conventional electrical connections may be made between the drive mechanism 30, the power source 34 and the switch 36 to enable the operation of drive mechanism 30.

The drive mechanism 30 is preferably formed as a unit with a housing 39 that is coupled to an interior of the housing 12 of the tape measure 10. An electric motor 40 of the drive mechanism 30 receives power from the power source 34, as regulated by the electrical switch 36, to provide the necessary torque for driving the rotation of a drive wheel 42 against the elongate tape 16 for tape extension, as seen in FIG. 2. The output torque of the motor 40 reaches the drive wheel 42 through various gears or contact rollers. To provide support when the drive wheel 42 is either in a position of engagement with the elongate tape 16 or disengaged and spaced from the tape 16, the drive wheel 42 is rotatably mounted to a moveable frame 44. Preferably, the frame 44 forms a post 46 that is slidably received through a bracket 48 of the drive mechanism housing 38 that also allows for a range of pivotable motion for the post 46. A spring 50 seated on the bracket 48 pushes upward on a pin 52 of the post 46 to thereby urge the post 46 upward relative to the bracket 48 and the drive wheel 42 into contact with the bottom surface 32 of the elongate tape 16. Additionally, an opening 41 is formed in the cartridge cover 18 of the tape cartridge assembly 14 to enable the drive wheel 42 to move into frictional engagement with the tape bottom surface 32.

To provide for user control over the extension and retraction of the elongate tape 16, an actuator 54 is pivotably mounted within the housing 12 and extends over a portion of the tape cartridge assembly 14. Through motion of the actuator 54, input may be initiated on the switch 36, to regulate electrical operation of the drive mechanism 30 for tape extension, and on the post 46, to control mechanical decoupling of the drive wheel 42 from the tape bottom surface 32 to allow the biasing on the reel 20 to retract the amount of elongate tape 16 payed out back into the housing 12. The actuator 54 includes a body 56 having an arcuate upper shelf 58 and at least one sidewall 60 extending downwardly from the upper shelf 58. The sidewall 60 has a lower region 62 that may be pivotably connected to the tape cartridge assembly 14 at, for example, the axis of rotation of the reel 20. Alternatively, the pivotable connection of the sidewall 60 may be with the housing 12. In either case, the pivotable motion of the actuator 54 enabled through a force input to a lever arm 64 extending from the actuator upper shelf 58 moves the body 56 generally over and around a portion of the tape cartridge assembly 14. The lever arm 64 may extend radially outward from the pivotable attachment point of the actuator 54 and through an upper opening 66 in the housing 12. By having the axis of rotation of the actuator 54 parallel to, or coaxial with, the axis of rotation of the tape reel 20, forward and backward motion on the lever arm 64 is aligned with the longitudinal direction of tape movement into and out of the housing 12. Therefore, intuitively, forward motion on the lever arm 64, as depicted in FIG. 2, provides the user with control of tape extension, and rearward movement on the lever arm 64, as depicted in FIG. 3, provides the user with control of tape retraction features of the tape measure 10.

Coupling of the actuator 54 with the switch 36 in the present embodiment is accomplished by a resilient strap member 68. The strap 68 has opposing first and second end regions 70, 72, each with an aperture. The switch 36 is coupled with the aperture of the first end region 70, and a pin 74 extending outwardly from the upper shelf 58 of the actuator 54 rearwardly from the lever arm 64 is placed within the aperture of the second end region 72. Preferably, the switch 36 is a momentary slider switch that is moved between an "on" position, allowing current to flow from the power source 34 to the motor 40 of the drive mechanism 30, and an "off" position, cutting off the flow of current to the motor 40. Because of the resilient nature of the strap 68, a certain amount of pushing force may be applied by the strap 68 to the switch 36 through a rearward movement of the lever arm 64 (e.g., to move the switch into the "off" position). However, the strap 68 is also sufficiently flexible as to buckle when the lever arm 64 continues in a rearward motion past the neutral or rest position shown in FIG. 1 to the position necessary to accomplish mechanical decoupling of the drive mechanism 30 from the elongated tape 16 as shown in FIGS. 3 and 4. This buckling results because the switch 36 has reached the "off position" but the pin 74 to which the strap 68 is attached at the second end region 72 continues on a rotational path generally towards the drive mechanism 30.

A trailing edge 76 of the sidewall 60 of the actuator body 56 intersects with the upper shelf 58 at a back end region of the actuator body 56. Formed at the back end region is an extension 80 that contacts an upper end 82 of the drive mechanism post 46 to impart a force on the post 46. When the lever arm 64 is moved sufficiently rearwardly, a force is applied by the extension 80 substantially downwardly on the post 46 that overcomes the expansion force of the spring 50 and displaces the post 46 downwardly. An axle 82 of the drive wheel 42 travels within a guide 84 to direct the wheel 42 away from the bottom surface 32 of the elongate tape 16 as the post 46 is moving downwardly. The position of the drive wheel 42 when the lever arm 64 is in the full rearward position is best seen in FIG. 4, and results in the mechanical decoupling of the drive mechanism from the tape.

In operation, the tape measure 10 functions in three operating modes: a rest mode, a tape extension mode and a tape retraction mode. FIG. 1 depicts the tape measure 10 in the rest mode where the lever arm 64 of the actuator 54 is in a neutral position between forward and rearward positions. At this point, the strap 68 has the slider switch 36 in the "off" position, and the spring 50 urges the post 46 upwardly to maintain the drive wheel 42 in contact with the bottom surface 32 of the elongate tape 16. Upon the user moving the lever arm 64 to the forward position shown in FIG. 2, the strap 68 pulls the slider switch 36 to the "on" position, enabling the flow of current from the power source 34 to the motor 40 to provide torque to the drive wheel 42 and drive the tape 16 out of the housing 12. Once the desired amount of tape 16 for measuring has been payed out, the lever arm 64 is returned to the neutral position and the strap 68 pushes the slider switch 36 to the "off" position, stopping the motor 40 and drive wheel 42 movement. The return of the lever arm 64 to the neutral position may be accomplished by the user or the actuator 54 or the slider switch 36 may be biased to return the lever arm 64 to the neutral position upon removal of a forward force on the lever arm 64 by the user. Upon stopping of the motor 40, the drive wheel 42 cooperates with the motor's neutral resistance to be rotated backwardly to hold the tape in the extended position.

To retract a desired amount of the extended tape 16 back into the housing 12, the lever arm 64 is pulled in a direction opposite of the direction for tape extension, i.e., rearwardly as shown in FIG. 3. Sufficient rearward movement of the lever arm 64 causes the extension 80 to move the post 46 substantially in the downward direction and overcomes the upward urging provided by spring 50. Once the drive wheel 42 is released from engagement with the tape bottom surface 32, the biasing on the reel 20 causes the reel to rotate in a direction to wind the tape 16 thereon and thus retract the tape 16 into the housing 12. If the lever arm 64 is released, the spring 50 urges the arm 64 back to the neutral position and the post 46 upwardly to reengage the drive wheel 42 with the tape bottom surface 32. Therefore, the user can selectively retract some or all of the extended tape 16 back into the housing 12 depending on input provided to the actuator 54. Additionally, movement of the lever arm 64 to the rearward position causes the strap 68 to buckle, as illustrated in FIGS. 3 and 4.

Turning to FIGS. 5-9, another embodiment of the tape measure 100 of the present invention is provided. Many components of the tape measure 10 illustrated in FIGS. 1-4 are present in the embodiment of the tape measure 100 illustrated in FIGS. 5-9, and therefore references to shared components between the embodiments will be abbreviated in the following discussion of the tape measure 100.

The tape measure 100 includes a housing shell 102 enclosing a tape cartridge assembly 104, a drive mechanism 106, a power source 108 and a pair of electrical switches 110a and 110b electrically coupled with the drive mechanism 106, and an actuator 112 initiating input on the switches 110a and 110b to drive powered tape extension and retraction, as well as enabling mechanical decoupling of the drive mechanism 106 from the tape cartridge assembly 104. The tape measure 100 provides the added functionality of powered tape retraction in addition to powered tape extension through the use of forward and reverse switches 110a and 110b and a reversible electric motor 114 of the drive mechanism 106. It should be understood that for the tape measure 100 embodiment of FIGS. 5-9, the tape cartridge assembly 104 and the power source 108 may be the same as the tape cartridge assembly 14 and the power source 34, respectively, of the embodiment of the tape measure 10 of FIGS. 1-4. Furthermore, as with the previous embodiment, the drive mechanism 106 may also include various gears and contact rollers to transfer output torque from the motor 114 to a drive wheel 116 engagable with an elongate tape 118 wound onto a rotatable reel 119 of the tape cartridge assembly 104. Within the housing shell 102, a guide roller 122 directs the elongate tape 118 through a lower opening 120 of the shell 102 during tape extension and retraction.

Figure 5:
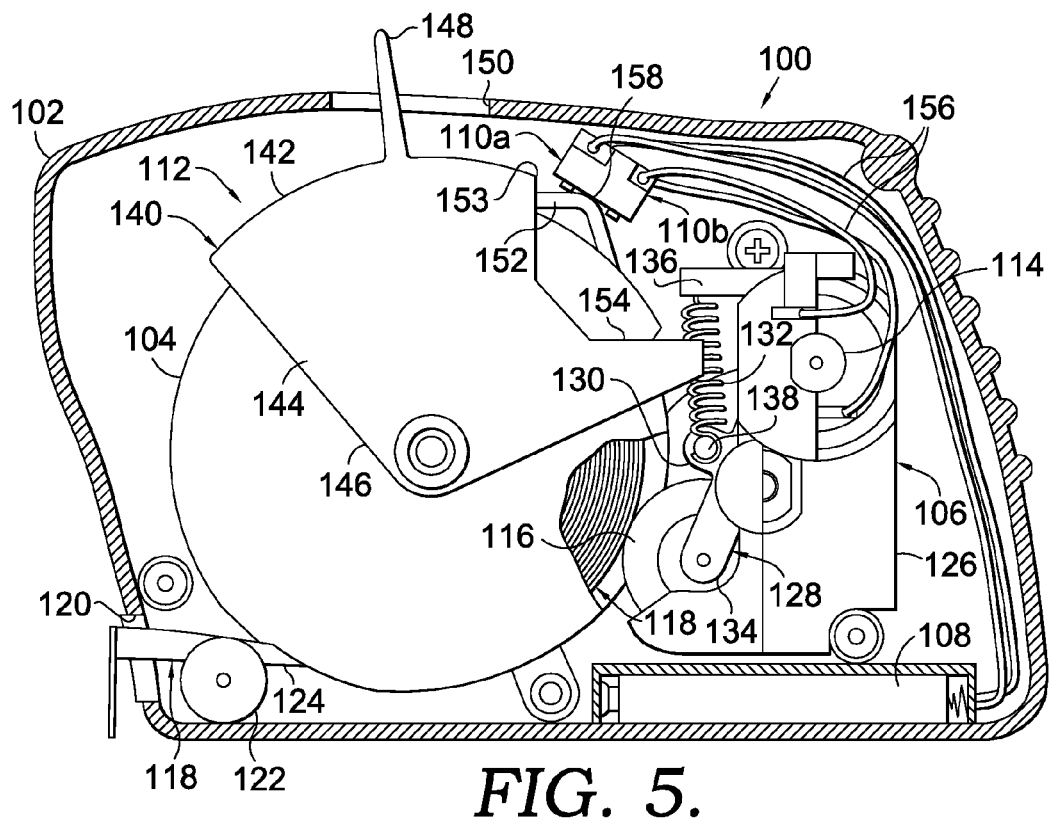
FIG. 5 is a side elevational view of another embodiment of a tape measure of the present invention, partially in section, including switches for initiating powered tape extension and powered tape retraction and with the actuator for controlling tape extension and retraction in a rest position.
Figure 6:
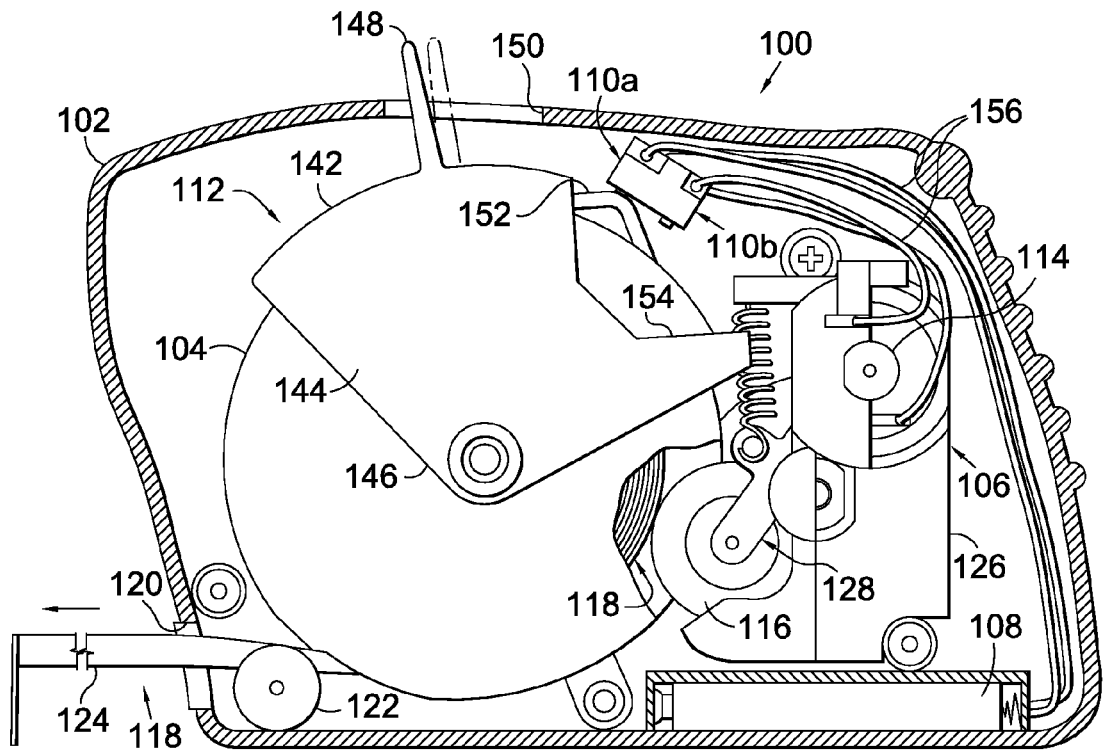
FIG. 6 is a side elevational view of the tape measure of FIG. 5, with the actuator in a forward position for activating powered tape extension.
Figure 7:
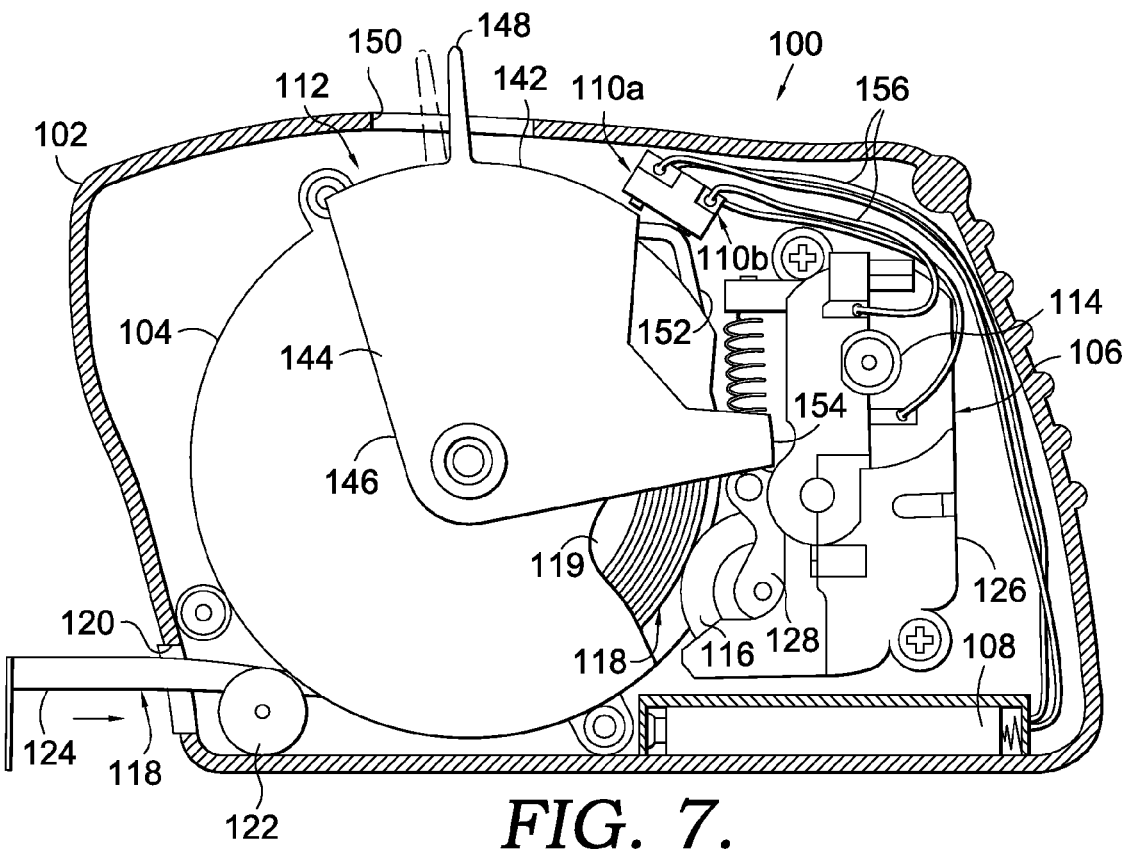
FIG. 7 is a side elevational view of the tape measure of FIG. 5, with the actuator in a first rearward position for activating powered tape retraction.
Figure 8:
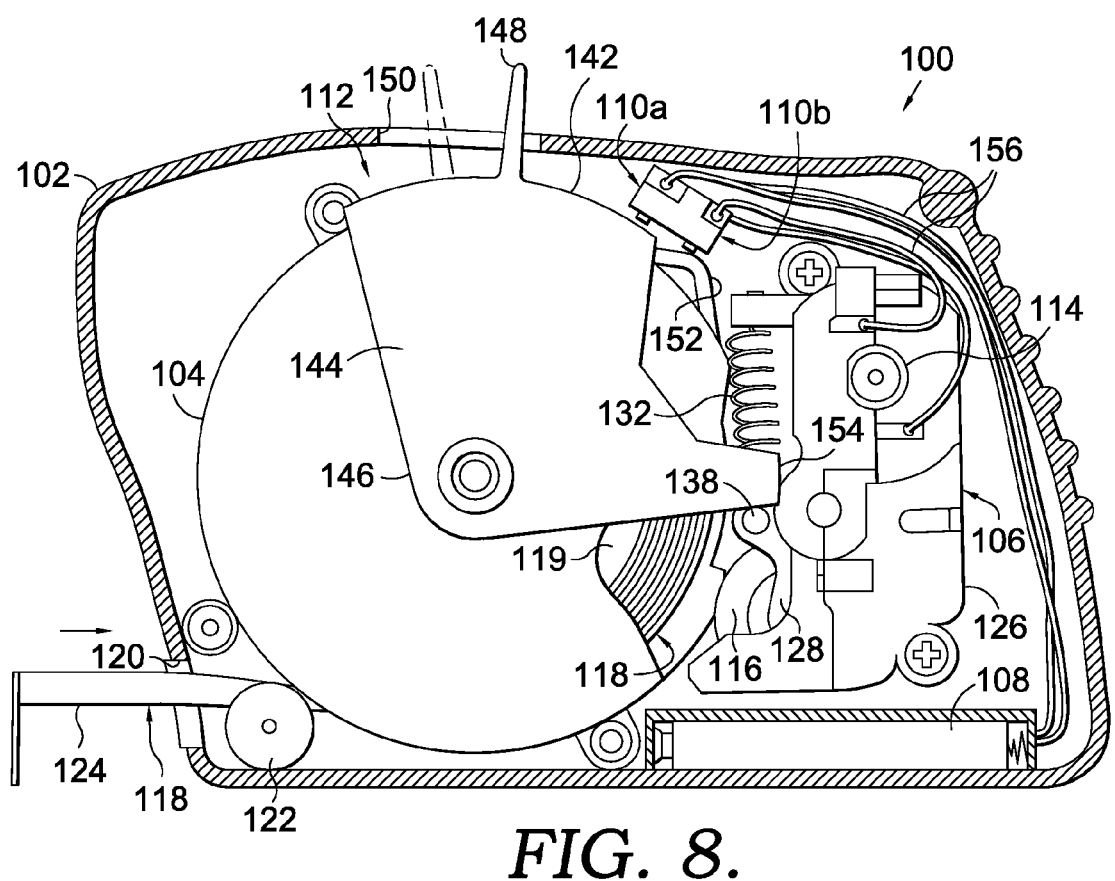
FIG. 8 is a side elevational view of the tape measure of FIG. 5, with the actuator in a second rearwards position for activating spring operated tape retraction.

As shown in FIG. 5, when the actuator 112 is in a neutral or rest position, no input is provided on switches 110a or 110b and the drive wheel 116 is contacting a bottom surface 124 of the elongate tape 118. The drive mechanism 106 may have a housing 126 rigidly affixed within the housing shell 102 so that the mechanism 106 is formed as a unit. A frame 128 to which the drive wheel 116 is rotatably mounted is coupled with the housing 126 for pivotable movement in relation to the housing 126. An upper section 130 of the frame 128 has a spring 132 connected thereto for urging pivoting of the frame 128 and movement of the drive wheel 116 upwardly and towards the elongate tape 118. The drive wheel 116 is mounted to a lower section 134 of the frame 128. Opposed ends of the spring 132 are connected with a bracket 136 of the drive mechanism housing 126 and with a post 138 of the frame 128. In the neutral or forward position of the actuator 112, depicted in FIGS. 5 and 6, respectively, the actuator 112 does not contact the post 138 and thus does not affect the drive wheel positioning 116 relative to the elongate tape 118. The spring 132, therefore, maintains the frame 128 at a position to ensure frictional engagement between the drive wheel 116 and the tape bottom surface 124 for driving extension and retraction of the elongate tape 118.

The actuator 112 is similar to the actuator 54 of the tape measure 10 embodiment of FIGS. 1-4, and includes a body 140 having an arcuate upper shelf 142 and at least one sidewall 144 extending downwardly from the upper shelf 142. The actuator 112 may be pivotably connected to the tape cartridge assembly 104 (or alternatively, to the housing shell 102) at a lower region 146 of the sidewall 144 along an axis parallel with, or identical to, the axis of rotation of the reel 119. Pivotable motion of the actuator 112 is initiated through forward and backward motion of a lever arm 148 extending generally radially outward from the upper shelf 142 of the actuator 112 and through an upper opening 150 of the housing shell 102.

A projecting member 152 extends outwardly from the actuator body 140 generally at a back end 153 of the upper shelf 142 and is configured for contacting the switches 110a and 110b through a range of pivotable motion of the actuator 112 as directed on the lever arm 148. Additionally, the sidewall 144 has a rearward portion that is formed into an extending leg 154 for contacting the post 138 of the frame 128 supporting the drive wheel 116. In this way, when the lever arm 148 is moved to a most rearward, as position shown in FIG. 8, the leg 154 moves the frame 128 downwardly through the pivoting motion thereof and the drive wheel 116 in an arcuate path away from the elongated tape 118 to disengage the drive mechanism 106 from the tape 118. With the drive mechanism 106 disengaged, the biasing on the reel 119 causes the reel 119 to rotate in a direction so as to retract the tape 118 into the housing shell 102.

A set of electrical wiring 156 connects the power source 108 with the electrical switches 110a and 110b and the reversible electric motor 114. By the projecting member 152 of the actuator 112 contacting the forward electrical switch 110a, current is directed from the power source 108 through the motor 114 in a direction so as to cause the drive wheel 116 to drive extension of the elongate tape 118 out of the housing shell 102. Conversely, contacting the rearward electrical switch 110b directs current from the power source 108 through the motor 114 in a direction so as to cause the drive wheel 116 to drive retraction of the elongate tape 118 back into the housing shell 102.

As can been seen in FIGS. 5-9, the tape measure 100 functions in four operating modes: a rest mode, a powered tape extension mode, a powered tape retraction mode, and a non-powered tape retraction mode. In the rest mode illustrated in FIG. 5, the lever arm 148 positions an apex 158 of the projecting member 152 between the switches 110a and 110b, so that neither switch is activated. Moving the lever arm 148 to the forward position, shown in FIG. 6, causes the projecting member apex 158 to initiate input on the forward switch 110a and activates the motor 114 to drive tape extension from the housing shell 102. Likewise, moving the lever arm 148 to a first rearward position, shown in FIG. 7, causes the projecting member apex 158 to initiate input on the rearward switch 110b and activates the motor 114 to drive tape retraction into the housing shell 102. At the first rearward position, the extending leg 154 of the actuator 112 moves close to the pin 138, but does not displace the frame 128, thereby leaving the drive wheel 116 still engaged with the bottom surface 124 of the elongate tape 118. The non-powered tape retraction mode is reached when the lever arm 148 is moved rearwardly beyond the first rearward position to a second rearward position, shown in FIG. 8. This movement positions the projecting member apex 158 rearwardly of the switches 110a and 110b and causes the extending leg 154 to overcome the upward biasing of the frame 128 by the spring 132 through contacting the frame post 138 and rotating the frame 128 and attached drive wheel 116 away from the elongate tape 118. This mechanical decoupling of the drive mechanism 106 from the tape 118 allows for tape retraction through biasing on the reel 119 without the need for motor 114 operation. For instance, a user may wish to use powered tape retraction to more slowly and precisely retract a certain amount of tape 118 into the housing shell 102 and leave some tape extended for making a length measurement. On the other hand, non-powered tape retraction saves battery power by avoiding the use of the power source 108, and may result in increased speed of tape 118 retraction if spring biasing on the reel 119 is sufficiently strong.

Turning to FIGS. 10-13, yet another embodiment of the tape measure 200 of the present invention is provided. Many components of the tape measure 100 illustrated in FIGS. 5-9 are present in the embodiment of the tape measure 200 illustrated in FIGS. 10-13, and therefore references to shared components between the embodiments will be abbreviated in the following discussion of the tape measure 200.

Like the tape measure 100, the tape measure 200 includes a housing shell 202 enclosing a tape cartridge assembly 204, a drive mechanism 206, a power source 208, a pair of electrical switches 210a and 210b electrically coupled with the drive mechanism 206, and a drive mechanism actuator 212 for initiating input on the switches 210a and 210b to activate powered tape extension and retraction. However, unlike the tape measure 100, where the actuator 112 is also capable of enabling mechanical decoupling of the drive mechanism 106 from the tape cartridge assembly 104, the tape measure 200 is provided with a separate manual tape retraction actuator 214 to provide the user with the ability to mechanically decouple the drive mechanism 206 from the tape cartridge assembly 204 to permit conventional spring powered retraction of the tape. Accordingly, the tape measure 200 provides the same functionality as the tape measure 100, namely, powered tape retraction in addition to powered tape extension, through the use of forward and reverse switches 210a and 210b and a reversible electric motor 216 of the drive mechanism 206, and spring powered tape retraction.

As with the embodiment of the tape measure 100 of FIGS. 5-9, it should be understood that the tape cartridge assembly 204 and the power source 208 will be the same as the tape cartridge assembly 14 and the power source 34 respectively of the embodiment of the tape measure 10 of FIGS. 1-4. Furthermore, as with the previous embodiment, the drive mechanism 206 may also include various gears and contact rollers to transfer output torque from the motor 216 to a drive wheel 218 that is engagable with a bottom surface 220 of an elongate tape 222 that is wound onto a rotatable wheel 224 positioned within the tape cartridge assembly 204.

Figure 10:
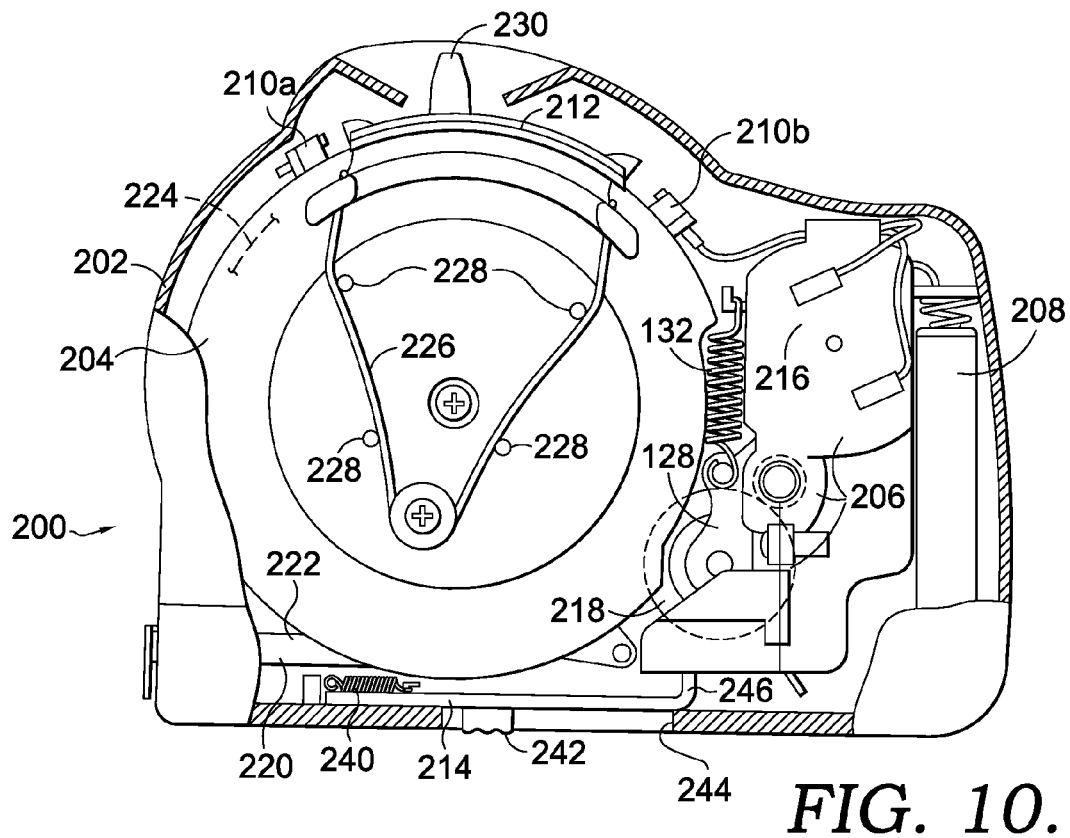
FIG. 10 is a side elevation view of yet another embodiment of a tape measure of the present invention, with portions of the housing cut away for clarity, and illustrating a drive mechanism actuator in a rest position and a manual retraction actuator in a rest position.

As shown in FIG. 10, when the drive mechanism actuator 212 is not acted on by a user, the drive mechanism actuator 212 is held in an intermediate rest position by a wire spring 226. In the rest position, the drive mechanism actuator 212 does not engage either the extension switch 210a or the retraction switch 210b. The wire spring 226 is positioned among retention posts 228 formed on an outer surface of the tape cartridge 204.

Figure 12:
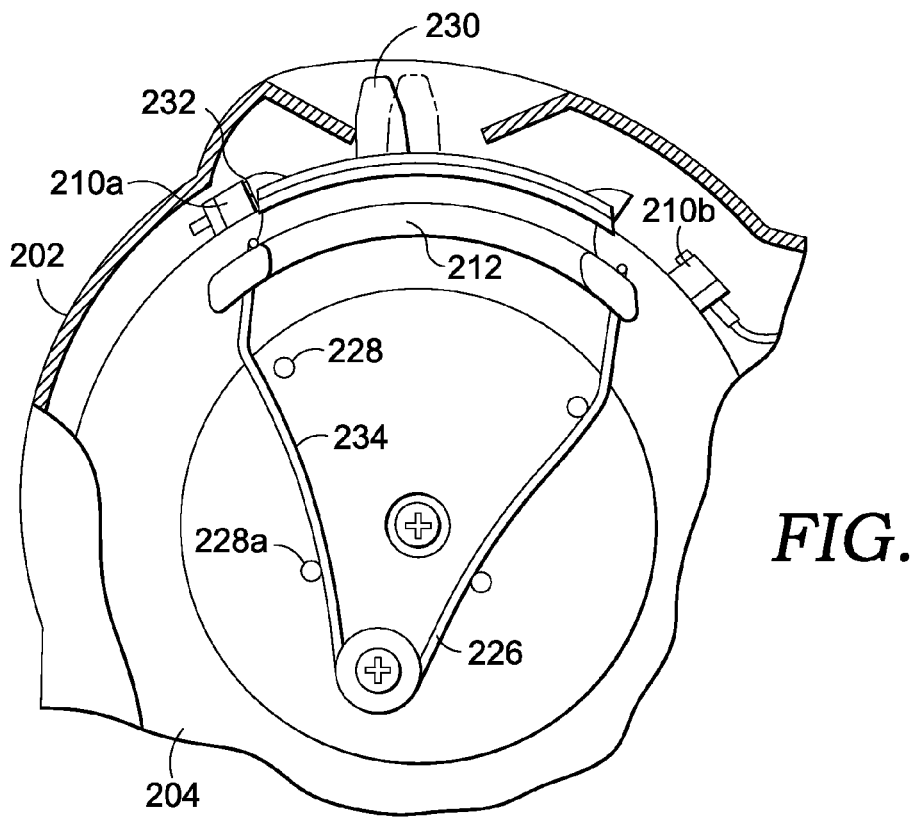
FIG. 12 is a fragmentary side elevation view of the tape measure of FIG. 10, with the drive mechanism actuator in a forward position, whereby a first switch is engaged for activating powered tape extension.

To initiate powered tape extension, the user would move the drive mechanism actuator to 12 from the rest position of FIG. 10 to a forward position, illustrated in FIG. 12, by pushing a lever arm 230 of the drive mechanism actuator 212 forward. In the forward position, a forward face 232 of the actuator 212 depresses and thereby activates the extension switch 210a, thereby activating the drive mechanism 206 to extend the tape 222 from the housing 202. When the actuator 212 is in it's forward position, a forward arm 234 of the wire spring 226 is flexed against the lower left retention post 228a, as illustrated in FIG. 12.

When the tape 222 has been extended a desired distance, the user removes forward pressure from the lever arm 230. In turn, the tension on the forward arm 234 of the wire spring 226 resulting from the forward arm being flexed about the retention post 228a biases the drive mechanism actuator 212 back to the rest position. As the forward arm 234 moves back to its unflexed position (illustrated in FIG. 10), the drive mechanism actuator 212 is returned to its rest position and the extension switch 210a is deactivated.

Figure 13:
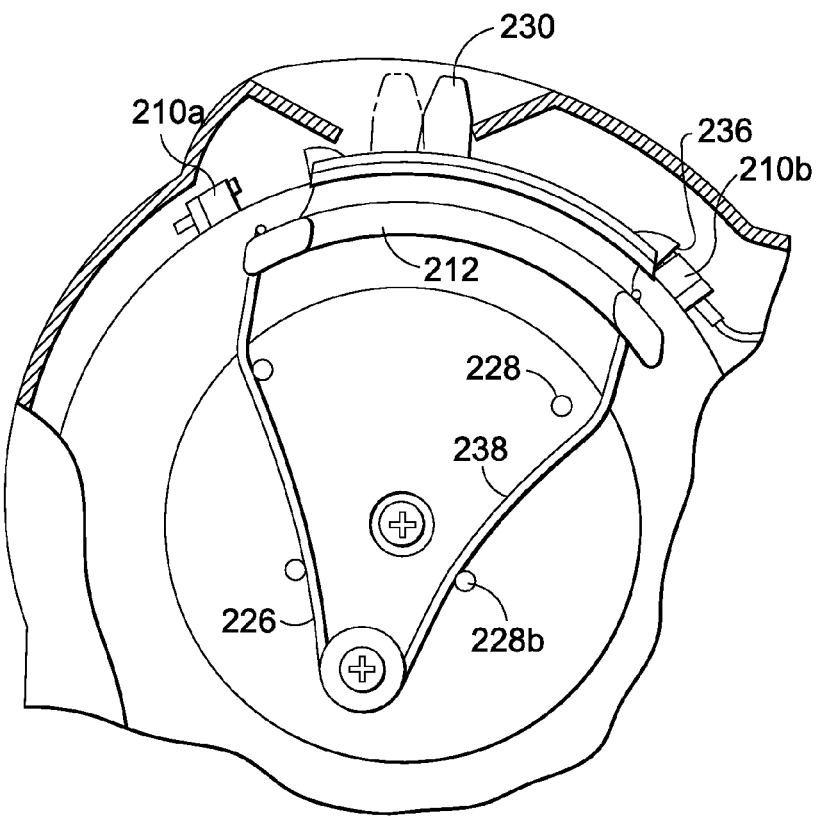
FIG. 13 is a fragmentary side elevation view of the tape measure of FIG. 10, with the drive mechanism actuator in a rearward position, whereby a second switch is engaged for activating powered tape retraction.

Similarly, when a user desires to power retract the extended tape 222, the user pulls the lever arm 230 rearwardly, thereby moving the drive mechanism actuator 212 from its rest position of FIG. 10 to a rearward position illustrated in FIG. 13. In the rearward position, a rearward face 236 of the drive mechanism actuator 212 depresses and thereby activates the retraction switch 210b, thereby activating the reversible motor 216 such that the drive mechanism 206 causes the tape 222 to be recoiled back into the cartridge 204.

When the drive mechanism actuator 212 is in the rearward position, a rearward arm 238 of the wire spring 226 is flexed rearwardly about the retention post 228b. The flexure of the rearward arm 238 biases the drive mechanism actuator 212 back to its rest position. When the operator has retracted a desired amount of the tape 222, the user removes the rearward pressure on the lever arm 230. In turn, the rearward arm 238 of the wire spring 226 moves the drive mechanism actuator 212 back to its rest position as the tension created by the flexure of the rearward arm 238 is released. As the drive mechanism actuator 212 returns to its rest position, the rearward face 236 is moved out of engagement with the retraction switch 210b and the reversible motor 216 is deactivated.

In addition to providing the user with an option of retracting the tape 222 into the housing 202 via the power driven motor 216, the tape measure 200 also provides the user with the option of retracting the tape 222 into the housing 202 manually under conventional spring power. This is especially useful in the event that the power source 208 becomes unavailable (e.g., the batteries die). As discussed in connection with the embodiments above, a recoil spring (not shown) positioned within the cartridge 204 biases the reel 224 to rewind any amount of the tape 222 that has been withdrawn from the housing 202. The biasing caused by the recoil spring is overcome by the natural tendency of the drive mechanism 206 to resist movement when the motor 216 is not activated. Accordingly, to enable the recoil spring to withdraw the extended tape 222 into the housing 202, the drive mechanism 206 must be mechanically decoupled from the bottom surface 220 of the elongate tape 222. In order to facilitate such decoupling, the tape measure 200 is provided with the manual retraction actuator 214.

The retraction actuator 214 is biased by a spring 240 to a rest position, which is illustrated in FIG. 10. The retraction actuator 214 has a user engagable tab 242 that extends through an aperture 244 in a lower portion of the housing 202. The retraction actuator 214 is slidably movable in a rearward direction from the rest position, illustrated in FIG. 10, to the use position illustrated in FIG. 11. The retraction actuator 214 includes an upwardly directed flange 246 at a rearward portion thereof. The flange 246 is designed to abut a downwardly depending arm 248 that is mechanically coupled with the frame 128 that supports the drive wheel 218. It should be readily understood that the arm 248 could be an integral part of the frame 128.

Figure 11:
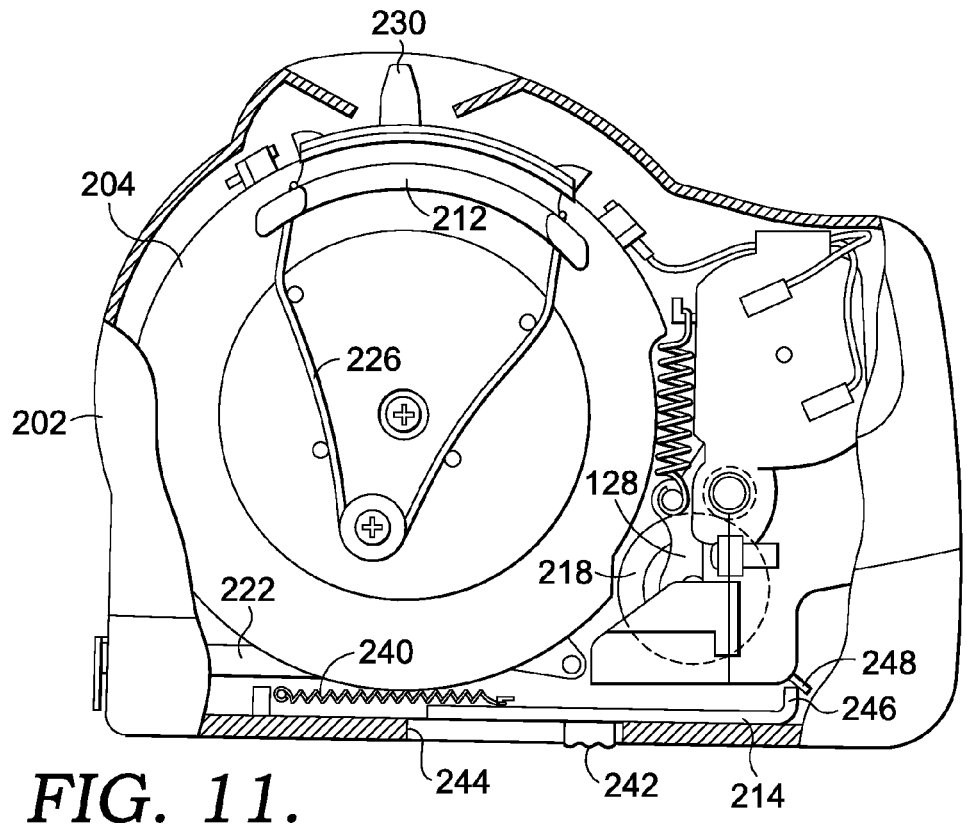
FIG. 11 is a side elevation view of the tape measure of FIG. 10, with the retraction actuator in a use position, whereby the drive wheel has been removed from abutting contact with the bottom surface of the tape.

As the retraction actuator 214 is moved from its rest position in FIG. 10 to its use position in FIG. 11, the retraction actuator 214 engages the arm 248 and further rearward movement of the actuator 214 causes rotation of the frame 128 away from the cartridge 204, thereby removing the drive wheel 218 from abutting contact with the bottom surface 220 of the tape 222 coiled on the reel 224. As discussed above, this mechanical decoupling of the drive mechanism 206 from the tape 222 permits the recoil spring to rotate the reel 224 to retract the tape 222 into the housing 202. When a desired amount of the tape 222 is retracted into the housing 202, the user can release the rearward pressure on the tab 242, thereby permitting the spring 240 to pull the retraction actuator 214 back to its rest position of FIG. 10. Simultaneously, the spring 132 will rotate the frame 128 back to a position where the drive wheel 218 engages the bottom surface 220 of the tape 222 coiled on the reel 224, thereby stopping rotation of the reel 224 and further spring powered retraction of the tape 222 into the housing 202.

Figure 14:
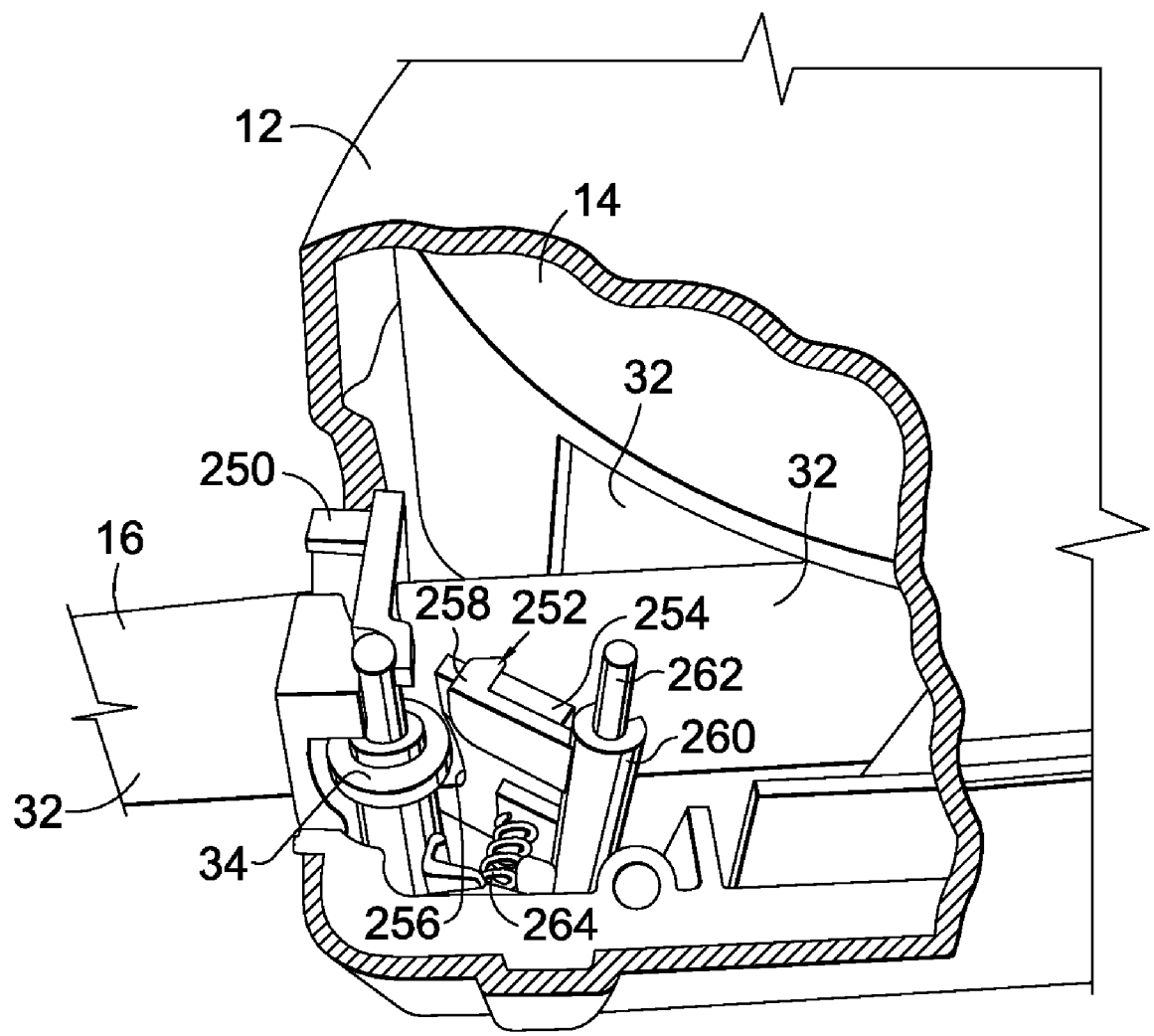
FIG. 14 is fragmentary bottom perspective view of a blade wiper mechanism for engaging the bottom surface of the tape with a portion of the housing removed to show various internal components thereof.

Turning now to FIG. 14, in addition to the inclusion of the guide roller 34, any of the embodiments disclosed herein may be provided with additional items to support the tape 16, such as a collar 250 and a wiper mechanism 252. The collar 250 may take the form of a molded plastic piece having an aperture therethrough. The aperture is preferably arcuate in shape to permit a lower surface of the aperture to support the blade 16 by abutting the bottom surface 32 of the blade 16 across its entire width during operation. Similarly, the wiper mechanism 252 is provided with a wiper insert 254. The insert 254 is provided with an arcuate cutout 256 adjacent an upper edge thereof for supporting, abutting, and wiping, the bottom surface 32 of the blade 16 during use. The wiper mechanism 252 also includes a frame 258 for receiving the insert 254. The frame 258 includes a tubular member 260 which is slidably received on a pin 262 that is supported by the housing 12. The frame 258 is thereby rotatably mounted on the pin 262. A spring 264 biases the insert 254 into abutting contact with the bottom surface 32 of the blade.

The insert 254 is preferably made out of a soft resilient material, such as felt, and is provided to "wipe" the bottom surface 32 of the tape 16 during use to prevent the build up of contaminants on the bottom surface 32 of the tape 16 that might interfere with the ability of the drive wheel 42 to move the tape 16 and/or prevent its movement when so desired. As it is the frictional relationship between the drive wheel 42 and the bottom surface 32 of the tape 16 which permits the drive mechanism 30 to control movement of the tape, the wiper mechanism 252 assists with providing a clean surface with which the drive wheel 42 cooperates. Additionally, if the drive wheel 42 is rubber in nature, the wiper mechanism 252 can also "wipe off" any particles of the rubber wheel which may over time work free from the drive wheel 42 and adhere to the bottom surface 32 of the tape 16.

From the foregoing it will be seen that the various embodiments of the tape measure of the present invention provide for simple and intuitive control of measuring tape extension and retraction through certain forward and backward motions on an actuator. Various modifications may be made to the embodiments of the tape measure described herein without departing from the scope of the invention. It will be understood that certain features and subcombinations are of utility and may be employed without reference to other features and subcombinations. This is contemplated by and is within the scope of the present invention. It is also to be understood that all matter herein set forth or shown in the accompanying drawings is to be illustrative of applications of the principles of the invention, and not in a limiting sense.

What is claimed is:

1. A power operated tape measure comprising:
   a housing shell;
   a tape cartridge assembly mounted within the housing shell and including:
      a rotatable annular reel;
      an elongate tape wound onto the annular reel, the tape having a surface; and
      a spring coupled with the annular reel;
   a drive mechanism mounted within the housing shell and being engagable with the surface of the tape to at least extend the tape out of the housing shell;
   a power source electrically coupled with the drive mechanism;
   at least one switch electrically coupled with the drive mechanism to control the flow of electrical power from the power source to the drive mechanism;
   a primary actuator operably mounted within the housing shell and having a body extending over a portion of the tape cartridge and an arm extending from the periphery of the body through a first opening in the housing shell, wherein application of a force on the arm moves the actuator to selectively initiate input on the at least one switch to enable or disable drive mechanism activity, the arm being moveable in opposed first and second directions such that sufficient arm movement in the first direction causes the drive mechanism to extend the tape out of the housing shell and sufficient arm movement in the second direction causes the tape to retract into the housing shell;
   a retraction actuator mounted within the housing shell for selectively engaging with the drive mechanism and for movement relative to the housing shell, wherein a portion of the retraction actuator is engagable by a user through a second opening in the housing shell, and wherein sufficient displacement of the retraction actuator in a first direction causes the drive mechanism to become disengaged from the surface of the tape, whereby spring powered retraction of the tape is permitted.

2. The tape measure of claim 1, wherein the at least one switch is a first switch, and wherein the tape measure further includes:
   a second switch electrically coupled with the drive mechanism to control the flow of electrical power from the power source to the drive mechanism, wherein activation of the first switch via sufficient movement of the arm of the primary actuator in the first direction causes the drive mechanism to extend the tape from the housing shell, wherein activation of the second switch via sufficient movement of the arm of the primary actuator in the second direction causes the drive mechanism to rewind the tape into the housing shell, and wherein the first and second switches are positioned on opposite sides of the lever of the actuator.

3. The tape measure of claim 2, wherein the primary actuator includes a wire spring for biasing the arm of the primary actuator to a rest position from either (a) a forward position where sufficient movement of the arm of the primary actuator in the first direction caused activation of the first switch, or (b)

a rearward position where sufficient movement of the arm of the primary actuator in the second direction caused activation of the second switch.

4. The tape measure of claim 1, wherein the first opening in the housing shell, through which the arm of the primary actuator extends, and the second opening in the housing shell, through which the portion of the retraction actuator is engagable by the user, are located on opposite sides of the housing shell from one another.

5. The tape measure of claim 1, wherein the drive mechanism includes a drive wheel, a frame onto which the drive wheel is rotatably mounted, and a depending arm mechanically coupled with the frame, the frame being biased in a direction so as to urge the drive wheel into engagement with the surface of the tape, whereby sufficient displacement of the retraction actuator in a first direction causes drive mechanism disengagement from the surface of the tape via the retraction actuator abutting and moving the depending arm to overcome the biasing on the frame of the drive mechanism and disengage the drive wheel from the surface of the tape to permit spring powered retraction of the tape.

6. The tape measure of claim 5, wherein the retraction actuator has a user engagable tab extending through the second opening in the housing shell and a flange for abutting the depending arm of the drive mechanism, the retraction actuator being biased towards a rest position by a spring, and wherein the rest position represents the position for the retraction actuator where the flange is spaced from the depending arm of the drive mechanism.

7. The tape measure of claim 1, further comprising a collar and a wiper mechanism mounted within the housing shell, the collar having an aperture through which the tape extends, and the wiper mechanism being operative to abut and contact the surface of the tape engaged by the drive mechanism to wipe the tape surface during at least one of extension and retraction of the tape.

8. A method of operating a powered tape measure including a housing shell, a tape cartridge assembly mounted within the housing shell and having a rotatable annular reel, an elongate tape wound onto the annular reel, and a spring coupled with the reel, a drive mechanism mounted within the housing shell for engaging with the tape to at least extend the tape out of the housing shell, a power source electrically coupled with the drive mechanism, at least one switch for controlling the operation of the drive mechanism, a primary actuator having an outwardly extending lever and being mounted within the housing shell for selectively engaging with the at least one switch and moveable relative to the housing shell through input received on the lever, and a retraction actuator mounted within the housing shell for selectively engaging with the drive mechanism and moveable relative to the housing shell by engagement therewith though an opening in the housing shell, comprising the steps of:

moving the lever to a forward position to cause the at least one switch to enable the drive mechanism to extend the tape out of the housing shell;

moving the lever to a rearward position to cause the at least one switch to allow retraction of the tape into the housing shell; and moving the retraction actuator to a use position to cause the drive mechanism to become disengaged from the tape and allow spring powered retraction of the tape into the housing shell.

* * * * *